Aug. 8, 1950   R. E. J. NORDQUIST   2,517,592
LIQUID FILLING MACHINE

Filed Dec. 21, 1944   4 Sheets-Sheet 1

INVENTOR.
Ronald E. J. Nordquist
BY Ivan D. Thornburgh
Charles H. Gene
ATTORNEYS

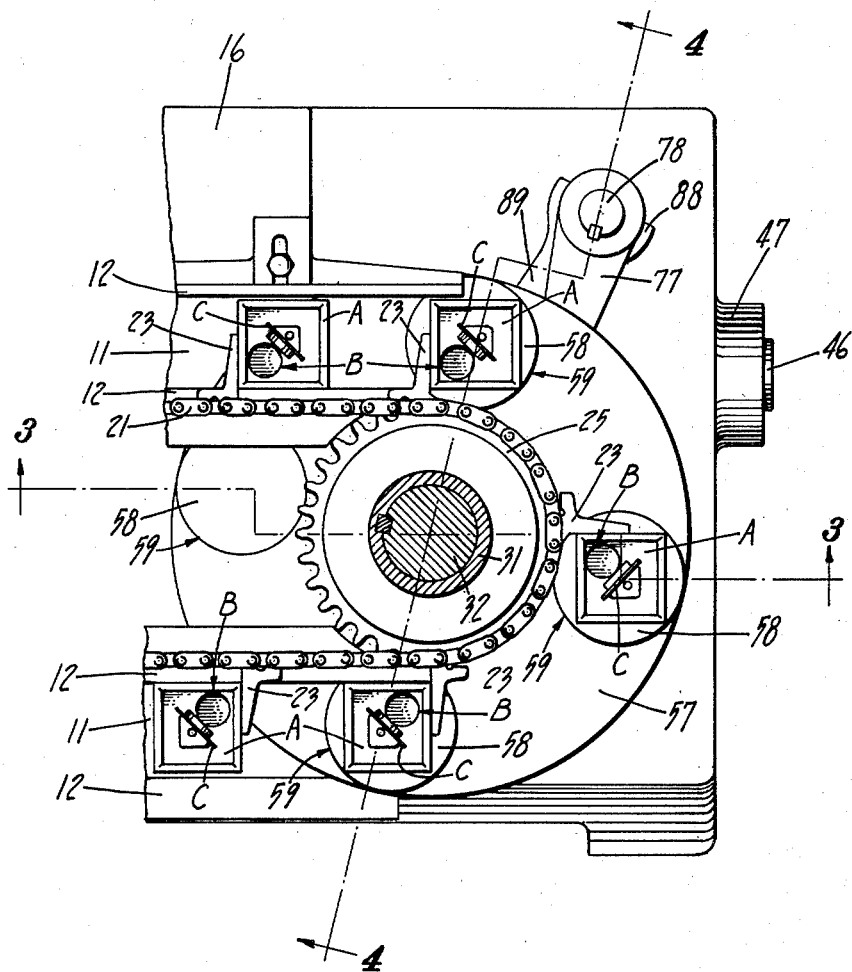

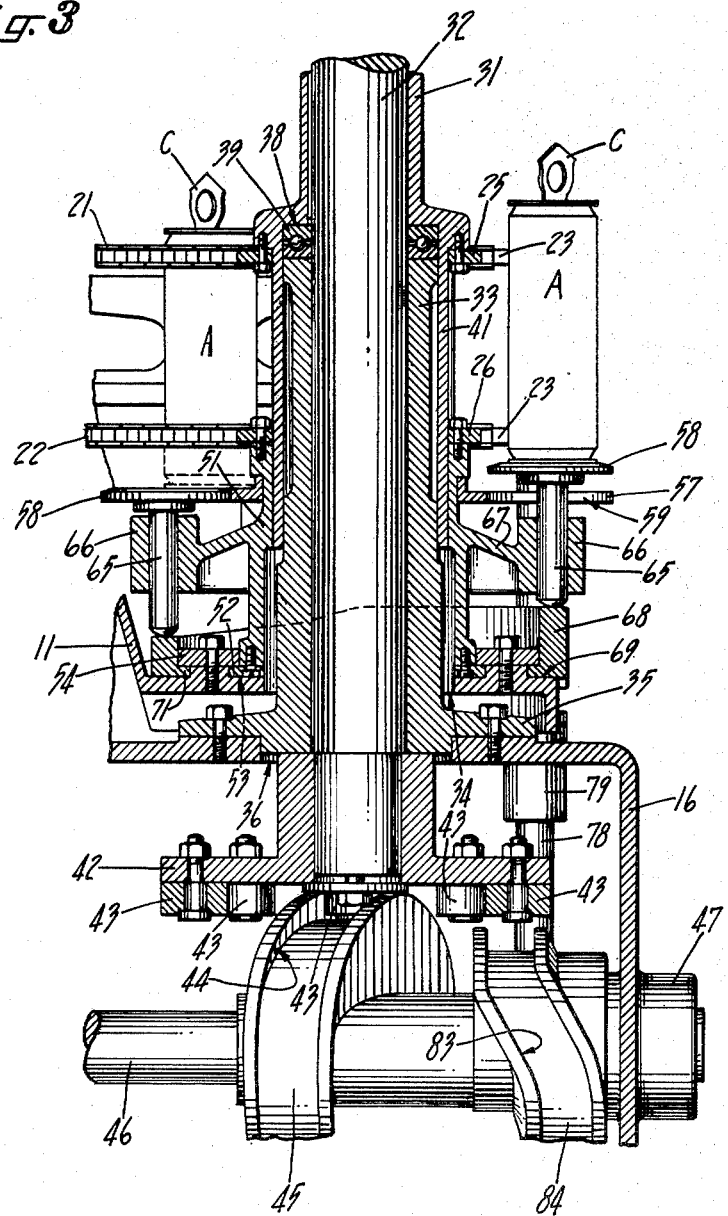

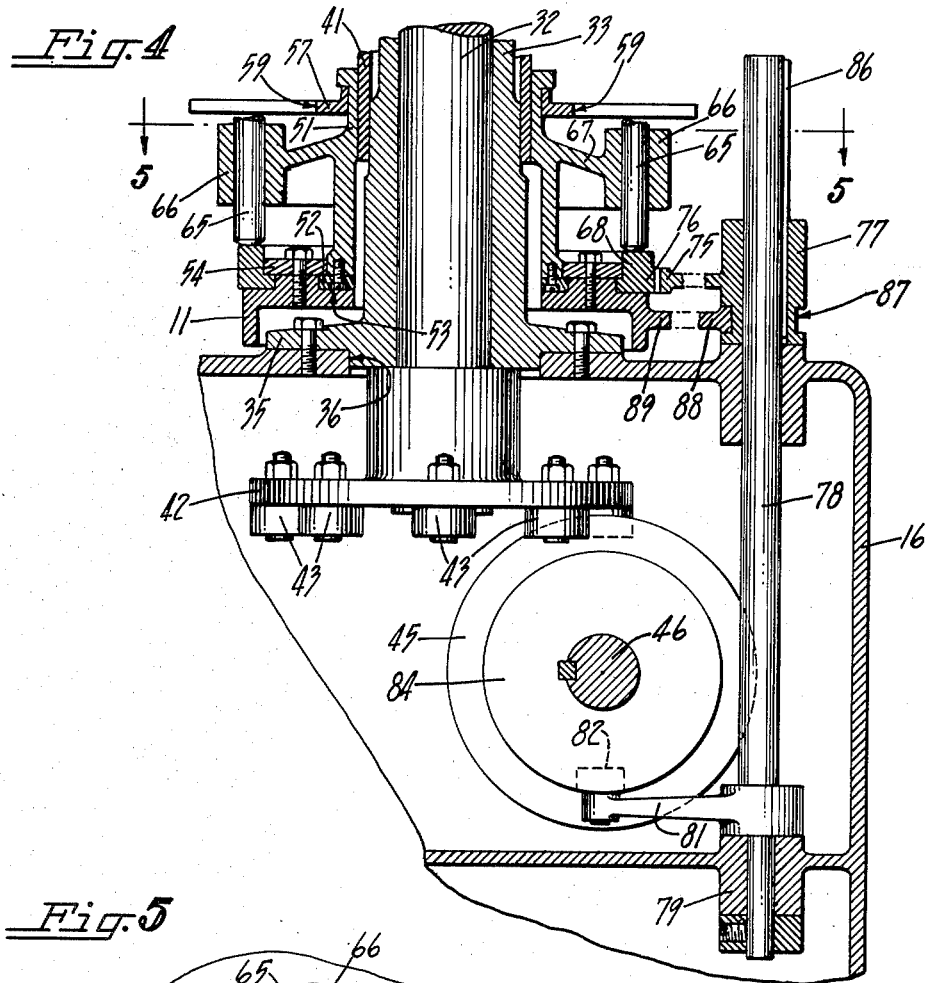
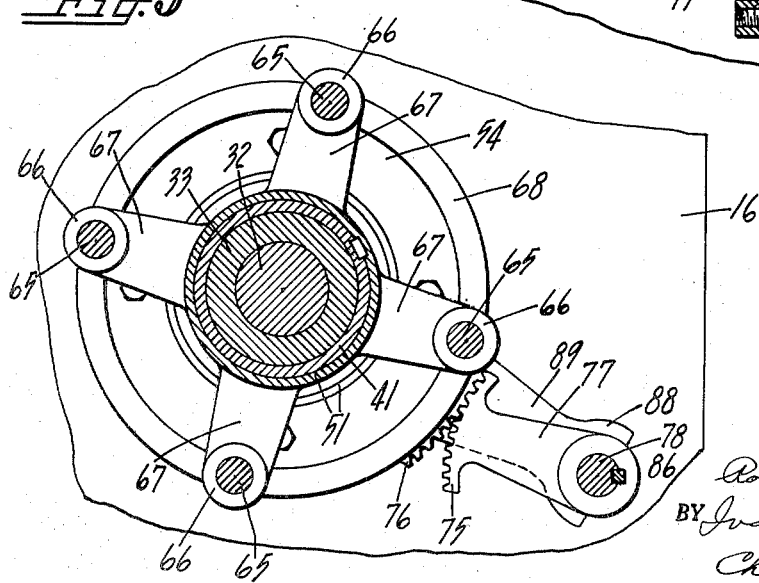

Patented Aug. 8, 1950

2,517,592

UNITED STATES PATENT OFFICE 2,517,592

LIQUID FILLING MACHINE

Ronald E. J. Nordquist, Maplewood, N. J., assignor to American Can Company, New York, N. Y., a corporation of New Jersey Application December 21, 1944, Serial No. 569,242

7 Claims. (Cl. 226—97)

The present invention relates to a machine for filling liquids, such as milk and the like, into fibre containers and has particular reference to devices for controlling the liquid filling time. This is a division of my United States patent application Serial Number 355,845, filed September 7, 1940, on Liquid Filling Machine, issued August 6, 1946 as Patent No. 2,405,232.

In recent years milk and milk products covering a wide range of varieties, such as ordinary milk, chocolate milk, buttermilk, cream, heavy cream, etc., have been packaged in fibre containers. In order to meet the demands of the trade these products are packaged in different sizes of containers which include half-pint, pint, quart and the like containers. These containers are of different heights to accommodate the different volumes of liquid packed into them. Nearly all dairies handle this variety of containers.

When the filling and closing of such a variety of containers is effected by automatic machinery it is usually necessary to have a special machine for each size of container. This usually works a hardship on the smaller dairies which may lack facilities for purchasing and maintaining and housing such a variety of machines.

The instant invention contemplates overcoming these difficulties by providing devices for controlling the filling time of the containers so that a number of varieties of containers may be readily filled in one machine.

An object of the invention is the provision in a liquid filling machine of devices wherein control may be had over the filling time so that containers having greater volumes than others may have sufficient time in a compact machine to receive their full volume of liquid.

Another object is the provision in such a machine of devices which operate to bring a container into filling position immediately upon delivery of the container into the filling station of the machine so that filling may begin even before the container begins to move through the filling cycle.

Numerous other objects and advantages of the invention will be apparent as it is better understood from the following description, which, taken in connection with the accompanying drawings, discloses a preferred embodiment thereof.

Referring to the drawings:

Fig. 2 is a horizontal section taken substantially along the line 2—2 in Fig. 1, with parts broken away;

Figure 1:
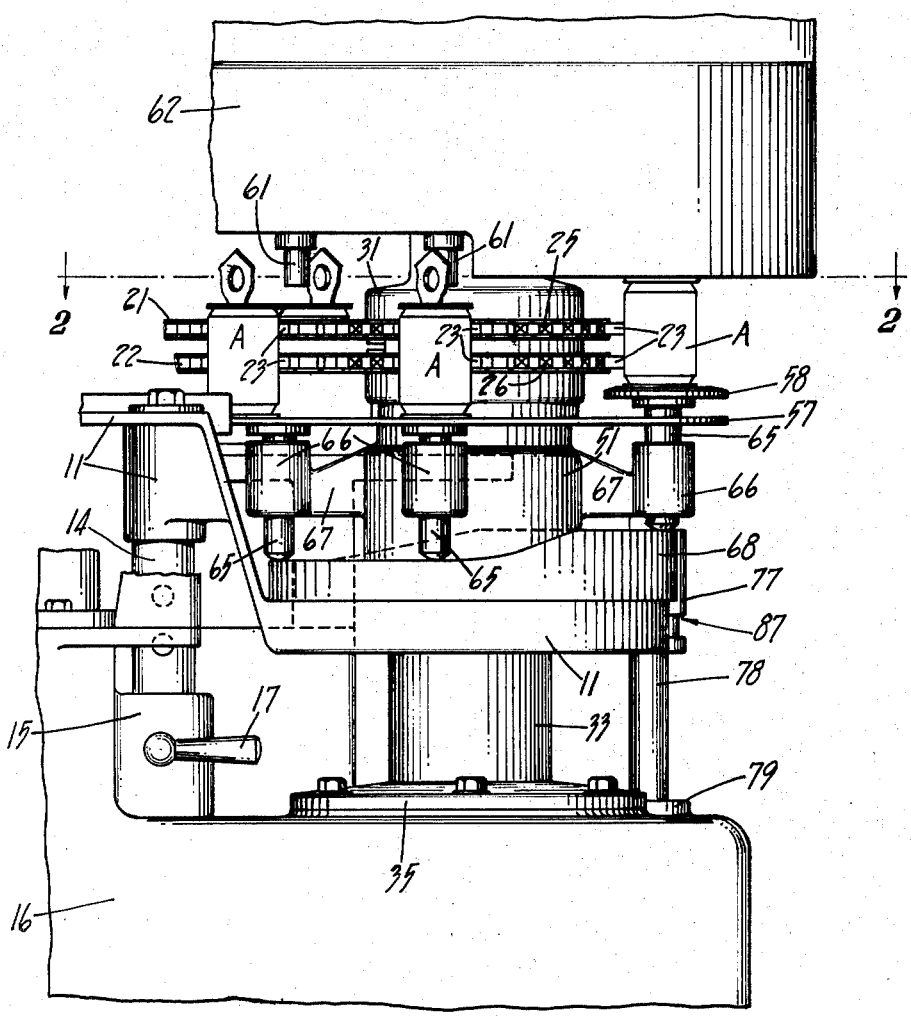
Figure 1 is a side elevation of a portion of a filling machine embodying the instant invention, with parts broken away.

Figs. 3 and 4 are vertical sections taken substantially along the respective broken lines 3—3, and 4—4 in Fig. 2, with parts broken away; and Fig. 5 is a horizontal section taken substantially along the line 5—5 in Fig. 4, with parts broken away.

As a preferred embodiment of the invention the drawings illustrate a machine for filling milk products into square fibre containers of the character disclosed in United States Patent 2,085,979, issued July 6, 1937, to J. M. Hothersall, on Container. Such a container, designated by the letter A in the drawings, is formed with a filling and dispensing opening B located in the top of the container. When the container is filled the opening B is closed and sealed with a plug closure element C which is hingedly connected to the container top adjacent the opening.

The containers A advance through the machine in an upright position and in a continuous procession along a horizontal table 11 (Figs. 1 and 2) and between suitable guide rails 12 secured to the table. The table is mounted on a vertical rod 14 slideably carried in a boss 15 formed on a frame 16 which constitutes the main frame of the machine. The rod is adjustable in its boss 15 for raising and lowering the table to accommodate containers of different heights. After such an adjustment of the table is made, the rod may be locked in place by a locking handle 17 in the boss 15.

The containers are propelled along the table 11 in an intermittent or step-by-step advancement by a pair of spaced upper and lower horizontal and parallel endless chain conveyors 21, 22 having a plurality of feed dogs 23 secured at spaced intervals along their lengths. These conveyors operate over and are driven by upper and lower driving sprockets 25, 26 respectively located at the filling head end of the machine, principal parts of which are illustrated in the drawings.

The upper driving sprocket 25 is bolted to an enlarged shouldered section of a vertical sleeve 31 (Fig. 3) which is keyed to a vertical drive shaft 32. The drive shaft is journaled in a long vertical bearing 33 which extends down through an opening 34 in the table 11 and which at its lower end is formed with a flange 35 bolted to the main frame 16 adjacent an opening 36 therein.

The sleeve 31 is supported on top of the vertical bearing 33 and for this purpose the sleeve is formed with a bearing seat 38 which retains a ball bearing unit 39. The ball bearing unit surrounds the drive shaft and is interposed between the sleeve seat and the top of the shaft bearing and permits free rotation of the sleeve. The lower portion of the sleeve, indicated by the numeral 41, extends down adjacent the outer surface of the shaft bearing 33 in rotating engagement therewith.

Rotation of the vertical drive shaft 32 and the parts carried thereon is preferably effected by an indexing plate 42 which is secured to the lower end of the shaft. The plate carries a plurality of cam rollers 43 which are spaced around the outer edge of the plate. These rollers are adapted to be individually engaged in a cam groove 44 of an indexing cam 45 mounted on and rotating with a main drive shaft 46 journaled in bearings 47 formed in the main frame 16. The drive shaft may be rotated in any suitable manner.

Hence upon each revolution of the cam 45 the cam groove 44 engages and moves a cam roller 43 and thus revolves the plate 42 and vertical shaft 32 through a partial rotation which is equal to the distance between the rollers on the plate. It is this intermittent motion that operates the upper chain conveyor 21 and the result is that the container is propelled along the table 11 in an intermittent or step-by-step manner.

The lower chain conveyor 22 is operated in synchronism with the upper conveyor 21 by the same driving mechanism just described but is arranged so that it may be raised or lowered relative to the upper conveyor and with the table 11 for the accommodation of the different height containers. For this purpose the lower conveyor driving sprocket 26 is bolted to a tubular hub 51 which surrounds the lower portion 41 of the sleeve 31.

The hub 51 is keyed to the sleeve portion 41 and therefore rotates with it but is adapted to slide on the key and sleeve relative thereto in a vertical direction. The lower end of the hub carries a projecting flange ring 52 which is seated in a recess 53 formed in the table 11 around its opening 34. The flange ring is retained against displacement from the table in the recess by an annular gib or ring 54 which is bolted to the table and which surrounds the hub 51.

As a container A, advancing along the table 11 moves adjacent the driving sprockets 25, 26 of the respective conveyor chains 21, 22 it slides off the table and moves onto a rotating disc 57 Figs. 1, 2 and 3) where it is received on a lifter pad 58 of a milk filling mechanism located at this end of the machine. The disc 57 surrounds the tubular hub 51 and is secured to it for rotation therewith. There are preferably four lifter pads 58 and they are disposed in openings 59 formed in the disc.

The lifter pads 58 are in vertical alignment with and below filling head nozzles 61 (Fig. 1) which extend down from a rotatable tank 62 which contains the milk or other liquid to be filled into the containers received on the lifter pads. There is one nozzle for each pad. The tank is mounted on the top of the sleeve 31 and is bolted in place thereon so that it rotates with the sleeve in time with the rotary disc 57.

Each lifter pad 58 is formed on the upper end of a vertical stem 65 carried in a bearing 66 on a lug 67 formed on the tubular hub 51. The lower ends of the stems 65 ride on a ring cam 68 which rests on the table 11 in an annular recess 69 of the table. The ring cam is formed with an inwardly extending flange 71 which is engaged by the gib 54 and is thereby retained against displacement. With this construction the lifter pads 58, the disc 57 and the cam 68 all move with the table when it is raised or lowered to accommodate containers of different heights.

The lifter pad disc 57 is rotated intermittently in time with the chain conveyor 21, 22 and this timing is preferably such that a container A comes into full position on its lifter pad just at the termination of one of these intermittent advancements. The lifter pad raises the container vertically into milk filling position. In such position a nozzle 61 of the tank 62 extends into the filling opening B of the container, as best shown in Fig. 1. This lifting is effected immediately upon the container being received on the lifter pad and while the disc 57 and the conveyors 21, 22 are stationary. Filling of the container thus begins without delay and this increases the filling time. Such a construction permits utilizing a compactly constructed machine which occupies a relatively small amount of floor space.

This immediate lifting of the container while the container advancing parts of the machine are stationary is brought about by a partial rotation of the ring cam 68 in its seat 69 on table 11. This brings the high portion of the cam into operation against the then stationary lifter pad stem 65 thereby lifting the pad to its full height in a single movement. This partial rotation is brought about by a segment gear 75 (Figs. 4 and 5) which meshes with segment gear teeth 76 formed on or secured to the outside of the ring cam 68. The segment gear 75 is formed on the end of an actuating arm 77 mounted on a vertical shaft 78. The shaft 78 is carried in a pair of spaced bearings 79 formed in the main frame 16.

A cam arm 81 is mounted on the lower end of the shaft 78. This arm carries a cam roller 82 which operates in a cam groove 82 (see Fig. 3) of a barrel cam 84. The cam 84 is mounted on the main drive shaft 46 adjacent its bearing 47, this being shown at the right in Fig. 3.

The cam 84 is shaped to shift the ring cam 68 circumferentially at the proper time and to hold it in this shifted position until the lifter pad disc 57 begins its next partial rotation. The ring cam 68 then oscillates or is shifted circumferentially back into its original position in time with the movement of the disc and thereby prolongs the time the raised lifter pad stem 65 is on the high portion of the cam as best seen at the right in Figs. 1 and 3.

The filling of the raised container with its contents is performed while it is carried in two steps through substantially half a revolution or 180° of travel of the intermittently rotating lifter pad disc 57. At the end of this curved path of travel the filled container is lowered by gravity to the level of the disc by the same ring cam 68 while the disc is stationary and on the same circumferential cam shifting movement that raises a succeeding container into filling position. Thus a maximum filling time is obtained within a minimum range of operation.

Provision is made for making this cam shifting mechanism effective for all heights of containers. For this purpose the segment gear arm 77 is slidably disposed on its actuating shaft 78 and moves on a long feather or key 86 carried in the shaft (Figs. 4 and 5). The hub of the arm 77 is formed with a groove 87 which accommodates a bifurcated end 88 of a rigid arm 89 which extends out from the table 11.

Hence when the table 11 is raised or lowered to accommodate the height of a container A, the rigid arm 89 carries the segment gear arm 77 with it, sliding it along its feather 86 in the actuating shaft 78 and holding it in operating position when the table is locked in place in its adjusted position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for filling liquids into containers, the combination of a hub having means for intermittently rotating the same, a reciprocable lifter pad mounted on a stem carried in said hub for receiving and carrying a container to be filled along a curved path of travel through a filling cycle, a rotatable normally stationary cam engageable by said stem for holding the lifter pad and the container in an elevated filling position, and means engaging and rotating said cam through a partial rotation immediately after the reception of a container on said lifter pad and while the pad is momentarily at rest between the intermittent rotations of said hub to quickly raise the pad and the container thereon into filling position so that the filling of the container will begin immediately after its reception by said pad.

2. In a machine for filling liquids into containers, the combination of a rotatable hub having means for intermittently rotating the same, a reciprocable lifter pad mounted on a stem carried in said hub for receiving and carrying a container to be filled along a curved path of travel through a filling cycle, a rotatable normally stationary cam engageable by said stem for holding the lifter pad and the container in an elevated filling position, gear teeth on said cam, a segment gear meshing with said gear teeth, means for rotating said segment gear to rotate said cam through a partial rotation immediately after the reception of a container on said lifter pad and while the pad is at rest between the intermittent rotations of said hub to rapidly raise the pad and the container thereon into filling position so that the filling of the container will begin immediately upon its reception on said pad, and means engaging and actuating said segment gear in synchronism with the intermittent rotation of said hub by said rotating means.

3. In a machine for filling liquids into containers, the combination of a hub having means for intermittently rotating the same, a plurality of bodily movable vertically reciprocable lifter pads mounted on stems carried in said hub for receiving and carrying containers to be filled along a curved path of travel through a filling cycle, a normally stationary cam engaging said stems for holding the lifter pads and the containers in an elevated filling position during their intermittent bodily movement, means engaging and rotating said cam in one direction through a partial rotation immediately upon the reception of a container on one of said lifter pads and while the pad is at rest between the intermittent rotations of said hub to rapidly raise the pad and the container thereon into filling position so that the filling of the container will begin immediately upon its reception on said pad, said cam engaging and rotating means being further operative to partially rotate said cam in the opposite direction to simultaneously lower another of said pads with a filled container thereon to its original depressed position to be discharged from said pad, and means for actuating said cam rotating means in synchronism with said hub rotating means for the purposes described.

4. In a machine for filling liquids into containers of different heights, the combination of a rotatable sleeve, a normally stationary table movable vertically to accommodate containers of different heights, a hub slidably mounted on said sleeve and rotatably carried on said table so that it will move therewith for containers of different heights, an indexing device for intermittently rotating said hub through a step-by-step movement, a plurality of lifter pads mounted on stems carried in said hub for receiving and carrying containers to be filled along a curved path of travel through a filling cycle, a normally stationary cam rotatably mounted on said table in a horizontal position to move with it for containers of different heights and engageable by said stems for holding the lifter pads and the containers thereon in an elevated filling position, a gear segment on said cam, a segment gear meshing with said gear segment and operating in time with said indexing device for rotating said cam through a partial rotation immediately upon the reception of a container on one of said lifter pads and while the pad is at rest between the intermittent rotations of said hub to raise the pad and the container thereon into filling position so that the filling of the container will begin immediately upon its reception on said pad, and means movable with said table when it is shifted for containers of different heights for shifting said segment gear with said table.

5. In a machine for filling liquids into containers, the combination of a vertically reciprocable lifter element bodily movable along a horizontal path of travel for receiving and carrying a container through a filling cycle, movable means engaging said lifter element and movable in said horizontal path of travel for raising and lowering said lifter element, and means for actuating said movable engaging means upon the reception of a container on said lifter element to shift the engaging means horizontally relative to said lifter element to quickly elevate the lifter element and the container thereon into filling position, whereby to commence filling of the container substantially coincidentally with its reception by the lifter element.

6. In a machine for filling liquids into containers, the combination of a vertically movable lifter element bodily movable along a horizontal path of travel for receiving and carrying a container through a filling cycle, a normally stationary horizontally reciprocable member engaging said lifter element for raising and lowering the latter, and means engaging said reciprocable member for horizontally moving the same in one direction relative to the lifter element immediately upon the reception of a container by the latter to quickly elevate the lifter element and its supported container into filling position so that the filling of the container will commence substantially coincidentally with its reception by the lifter element.

7. In a machine for filling liquids into containers, the combination of a vertically reciprocable lifter element having means for intermittently moving the same bodily along a horizontal path of travel for receiving and carrying a container through a filling cycle, movable means engaging said lifter element and rotatable in opposite directions for raising and lowering said lifter element, and means engaging said rotatable means for rotating the same relative to the lifter element in one direction immediately upon the reception of a container on said lifter element and while the latter is temporarily at rest, to quickly elevate the lifter element and its received container into filling position so that the filling of the container will begin substantially coincidentally with its reception by the lifter element.

RONALD E. J. NORDQUIST.

REFERENCES CITED

The following references are of record in the file of this patent:

UNITED STATES PATENTS

| Number | Name | Date |
|---|---|---|
| 956,285 | Champ | Apr. 26, 1910 |
| 1,016,611 | Chilton | Feb. 6, 1912 |
| 2,405,232 | Nordquist | Aug. 6, 1946 |

FOREIGN PATENTS

| Number | Country | Date |
|---|---|---|
| 222,067 | Great Britain | Sept. 25, 1924 |